Nov. 9, 1965     E. G. SIMKO     3,216,466
PRESSURE ACTUATED RELEASE MECHANISM
Filed Sept. 20, 1961     3 Sheets-Sheet 1
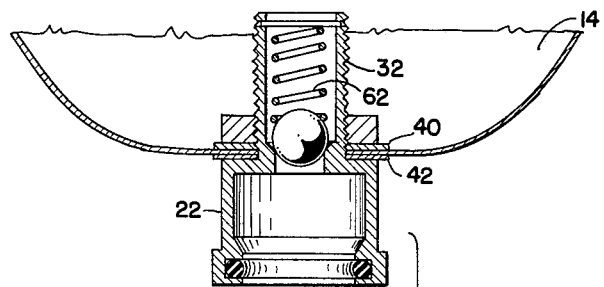
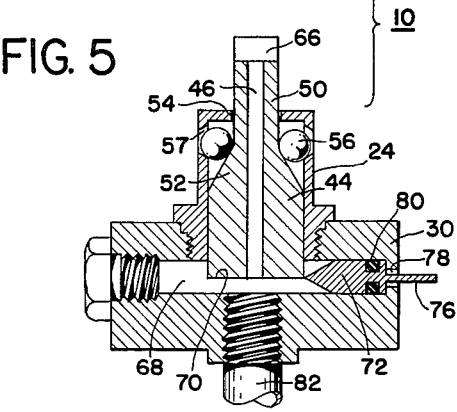
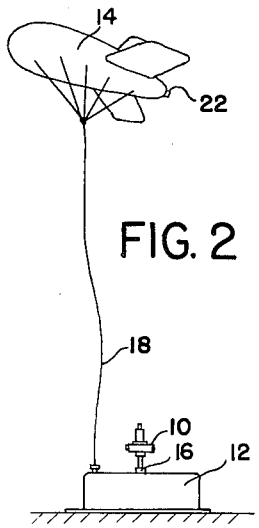
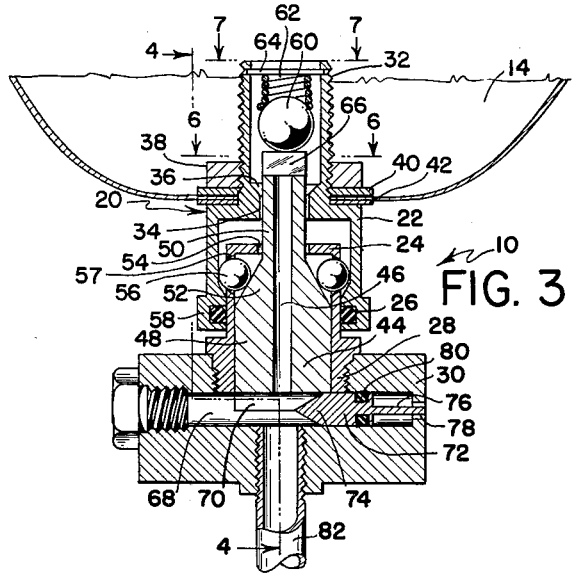
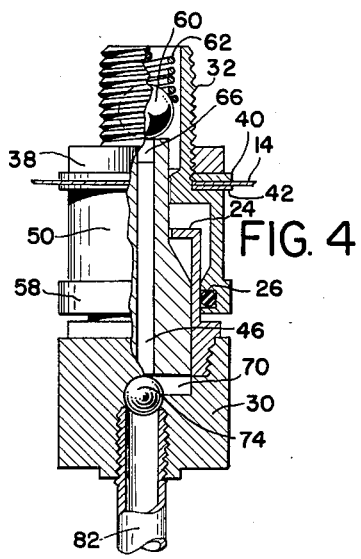
INVENTOR.
EDWARD G. SIMKO
BY Harold D. Jastram
ATTORNEY Nov. 9, 1965   E. G. SIMKO   3,216,466
PRESSURE ACTUATED RELEASE MECHANISM
Filed Sept. 20, 1961   3 Sheets-Sheet 2

*INVENTOR.*
EDWARD G. SIMKO

BY Harold D. Jastram

ATTORNEY

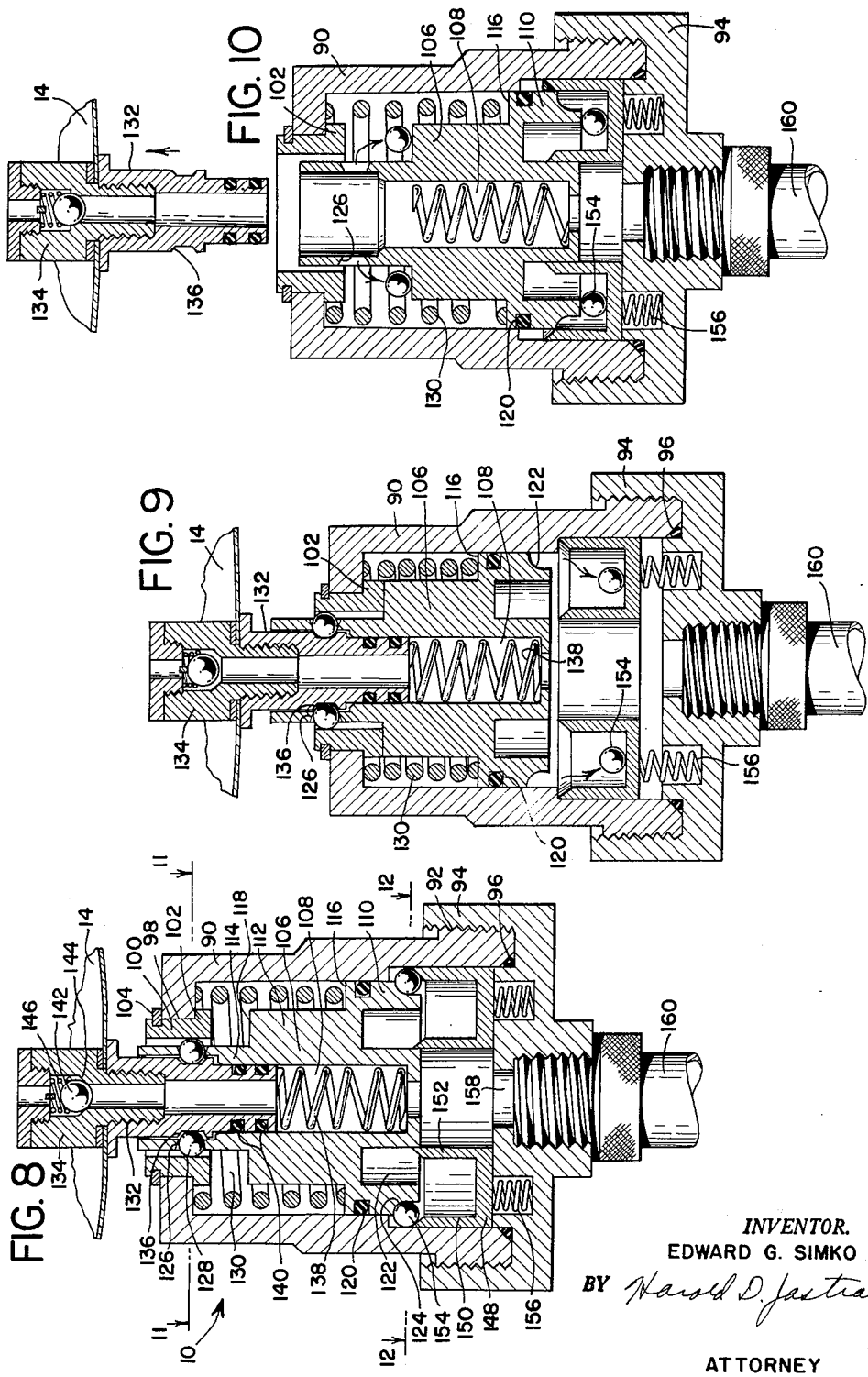

United States Patent Office 3,216,466
Patented Nov. 9, 1965

3,216,466
PRESSURE ACTUATED RELEASE MECHANISM
Edward G. Simko, Minneapolis, Minn., assignor, by mesne assignments, to Litton Systems, Inc., Beverly Hills, Calif., a corporation of Maryland
Filed Sept. 20, 1961, Ser. No. 139,436
3 Claims. (Cl. 141—226)

The present invention relates to a release mechanism, and more particularly to a pressure responsive mechanism designed to release a balloon or other inflatable structure from a pressurized gas source.

In various balloon systems it is sometimes necessary to remotely inflate the balloon with a gas which is stored in a high pressure tank. Inflation of the balloon is sometimes initiated by means of an electrical signal which actuates an explosive valve, by means of a solenoid valve, or the like, positioned between the balloon and the tank. In this type of balloon system, it is necessary that means be provided whereby the balloon can be released and separated from the tank after inflation has been completed, so that the balloon can then ascend into the atmosphere. In some cases, the balloon is released from the gas tank by means of a device which is actuated by an explosive charge, or by means of a timer, or the like.

The above noted methods of releasing the balloon from the tank are not always satisfactory. For example, an explosive actuated device requires an electrical signal for initiation and therefore the release has to occur at a preset time after the start of inflation. Similarly, if a time actuated release mechanism is used, the release occurs at a preset time after inflation begins. Since the inflation time will vary with different ambient conditions, a sufficient time must be allowed so that full inflation of the balloon will occur under all conditions. In some instances, the balloon might not be sufficiently inflated if the above noted methods are used.

Accordingly, one object of the present invention is to provide an improved release mechanism.

Another object is to provide a device which will effectively release an inflatable structure from an inflation means regardless of ambient conditions.

Another object is to provide a mechanism which will release an inflated structure in response to a change in pressure within the inflation means.

A further object is to provide a release mechanism which will effectively release an inflatable structure from a pressurized gas source after the body is fully inflated with gas.

A still further object is to provide a mechanism which will connect an inflatable structure to a pressurized gas source and which will effectively release the inflatable structure from the gas source after the structure has been filled with gas, in response to a relative change in pressure within the gas source.

Preferably, the invention can be used to connect an inflatable structure, such as a balloon, to a storage tank which contains a pressurized gaseous medium, and at a subsequent time, after the balloon has been inflated, automatically release the balloon from the storage tank. The release mechanism, although it initially securely connects the balloon to the storage tank, is so constructed that it will be actuated by an initial surge of the pressurized gaseous medium from the storage tank when a valve means is opened, in such a manner that the mechanism will release the balloon after the balloon has been inflated and after the gas has been expended from the storage tank. In other words, as the gaseous medium flows into the balloon, and the pressure within the storage tank decreases to a small increment of the initial pressure, the balloon will be filled with the gaseous medium, as well as released from the storage tank.

Other objects and advantages of the invention will become apparent from a consideration of the following specification and accompanying drawings, wherein:

FIGURE 1 is a side elevational view of a deflated balloon connected to a storage tank by means of a release mechanism;

FIG. 2 is a side elevational view of the balloon after it has been fully inflated with a gaseous medium and thereafter released from a storage tank;

FIG. 3 is a longitudinal sectional view of one embodiment of a release mechanism;

FIG. 4 is a partial schematic elevational view taken along line 4—4 of FIG. 3;

FIG. 5 is a schematic elevational view of the release mechanism of FIG. 3 illustrating the mechanism in a different operating condition;

FIG. 8 is a longitudinal sectional view illustrating another embodiment of the invention;

FIG. 9 is a longitudinal sectional view of the release mechanism of FIG. 8 but illustrating said mechanism in a different operating condition;

FIG. 10 is a longitudinal sectional view illustrating the release mechanism of FIG. 8 in a still different operating condition;

Figure 6:
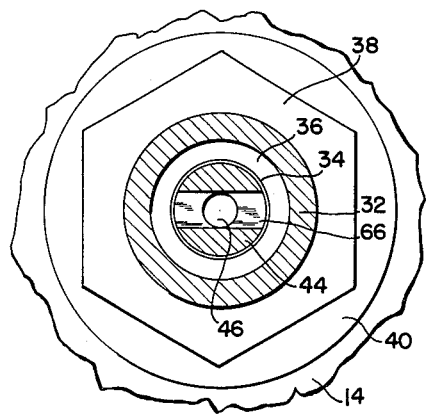
FIG. 6 is an enlarged partial cross-sectional view taken along line 6—6 of FIG. 3.

FIGURE 1 illustrates the release mechanism, designated generally by reference numeral 10 attached to a supply tank 12 which contains a gaseous medium, such as helium, in a pressurized state. Preferably, the gas pressure in the supply tank 12 should be maintained between 500 p.s.i. and 3000 p.s.i., dependent upon the circumstances and conditions of the desired flight. A valve means 16 is provided which controls the passage of the gaseous medium from the supply tank through the release mechanism to the balloon. Valve 16 might be any commercially available quick opening valve and will not be described in detail. A balloon 14, shown in a deflated condition, is attached to the opposite end of the release mechanism. While I have shown the invention in combination with a balloon, it is envisioned that other types of inflatable structure such as balls, beach equipment and the like, might be effectively remotely inflated and released from a gas source as well.

In FIGURE 2, the balloon 14 has been inflated with the gaseous medium and thereafter released from the gas source. A tethering line 18 is provided to connect the balloon 14 to the tank 12.

FIGURE 3 illustrates one embodiment of the release mechanism shown in FIGURE 1. The release mechanism 10 includes a housing designated generally by reference numeral 20. Housing 20 includes two members, a retainer 24, and a sleeve 22 which fits over the retainer 24. An O-ring seal 26 is retained within sleeve 22 and provides a gas tight connection between the sleeve 22 and the retainer 24. The retainer 24 is provided with a threaded portion 28 and is adapted to be connected to a base member 30. Sleeve 22 is provided with a threaded neck portion 32 which has a throat 34 and a valve seat 36. The sleeve 22 is adapted to be attached to a balloon or other inflatable structure by means of a nut 38. The washers 40 and 42 are provided to insure a gas tight connection.

Slidably disposed within retainer 24 is a funnel-shaped piston 44, having a duct 46 extending from a base or first end to the opposite end thereof. The duct 46 serves as a passage for the gaseous medium as it flows through the release mechanism during inflation of the balloon. The funnel-shaped piston 44 is comprised of three portions; a first cylindrical portion 48, a second cylindrical portion 50 and a third conical portion 52. The portion 48 has a diameter which is substantially the same as the inner diameter of the retainer 24. The second portion 50 has a smaller diameter than the first portion 48, and projects through an opening 54 in the retainer 24, and through the throat 34 in the neck 32 of the sleeve 22. The third portion 52 is interposed between portions 48 and 50 and has a diameter varying in dimension from a maximum at a point abutting the first portion 48, to a minimum at a point abutting the second portion 52. The top end of piston 44 has a transverse opening 66, which aids in permitting the gaseous medium to flow through the piston 44 (note FIGURE 6).

The sleeve 22 and the retainer 24 are connected together by means of balls 56 retained within opening 57 in the wall of the retainer 24. When the piston 44 is in the position shown in FIGURE 3, the balls 56 are forced outwardly by the portion 52 of the piston 44, and engage portion 58 of the sleeve 22, thus connecting the two members of the housing together.

Figure 7:
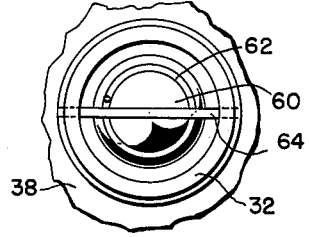
FIG. 7 is an enlarged partial cross-sectional view taken along line 7—7 of FIG. 3.
Figure 11:
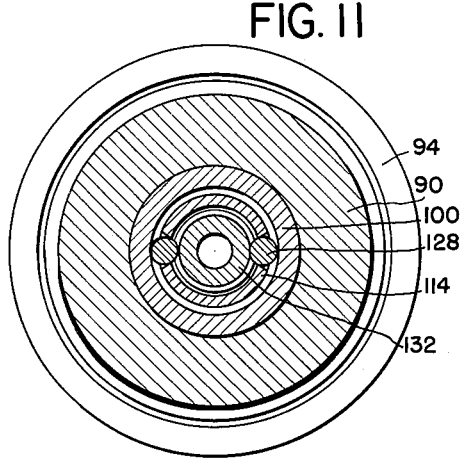
FIG. 11 is a cross-sectional view taken along line 11—11 of FIG. 8.
Figure 12:
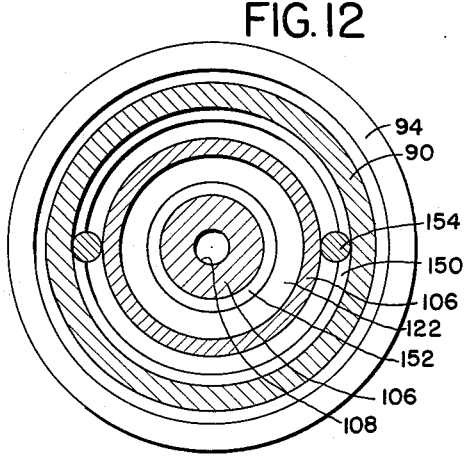
FIG. 12 is a cross-sectional view taken along line 12—12 of FIG. 8.

Positioned within the neck 42 is a valve which includes a ball 60 which is adapted to be positioned within the valve seat 36. As noted in FIGURE 3, the ball 60 is seated on top of the piston 44, and is biased toward the valve seat 36 by means of coil spring 62. Spring 62 also exerts a force against the piston 44 and urges the piston towards the base 30. As noted in FIGURE 7, the spring 62 is maintained within the neck 32 by means of a pin 64.

Base member 30 is provided with an elongated chamber 68 therein, which extends along the longitudinal axis of the base member. A piston seat designated by reference numeral 70, having the same diameter as the base end or first portion 48 of the piston 44, is provided and permits the piston 44 to be seated therein. A cylindrical shaped plunger 72, having a conical end portion 74, is slidably disposed within the chamber 68 and is adapted to engage the piston 44 to be seated therein. A cylindrical shaped plunger 72, having a conical end portion 74, is slidably an opening 78 in the base member. O-ring 80 is provided to prevent leakage of gas through the base member during inflation. The release mechanism is inflatably connected to the tank 12 by inlet means 82.

Having described one embodiment of the invention, reference will now be made to the manner of operating the release mechanism.

Prior to use, the release mechanism 10 is loaded by placing the sleeve 22 over the retainer 24 and pushing the plunger 72 toward the opposite end of the base member 30. As the plunger 72 is pushed toward the opposite end of the base member 30, end 74 engages the under surface of the base end of the piston 44, thus forcing it upward against the force of the spring 62. As the piston 44 moves upward, the balls 56 are forced outwardly so that they engage portion 58 of the sleeve 22, thus locking the sleeve 22 and the retainer 24 together. Further, as the piston 44 moves upward, the top end of the piston forces the ball 60 out of the valve seat 36.

At a desired time the valve 16 is opened and the high pressure gas rushes into the base member 30, through the duct 46 in the piston 44, past the ball 60, and through the neck 32 into the balloon 14. When the gas flows into the base member 30, the pressure is sufficient to move the plunger 72 toward the right as shown in FIGURE 5. The high pressure in the base 30 is sufficient to hold the piston 44 in its initial position against the force of the spring 62, and the low pressure in the balloon 14. Connection of the balloon 14 to the tank 12 is thus maintained during inflation. As the inflation continues and the gas pressure in the tank 12 reaches a low level, for example 25 p.s.i, the balloon is inflated and the force of the spring urges the piston 44 down into the piston seat 70. As the piston 44 moves down, the balls 56 are permitted to move freely toward the center of the piston and the sleeve 22 is free to slip off the retainer 24 as illustrated in FIGURE 5. As the sleeve 22 slips off, the valve means closes and prevents the gas from escaping from the balloon, that is, the ball 60 is forced into the valve seat 34. The sleeve 22 remains secured to the balloon 14 as the balloon ascends.

The release mechanism illustrated in FIGURES 8–12 is similar to that of FIG. 3, but illustrates a different embodiment of the invention.

In this embodiment the release mechanism 10 includes a housing 90 having a threaded portion 92 which is connected to a base member 94. An O-ring seal 96 is provided to maintain a gas-tight connection. Located at the opposite end of the housing is an opening 98 which has a collar 100 inserted therein. The collar 100 has a shoulder portion 102 adapted to abut against the housing 90, and may be fixedly mounted in the opening 98 by means of a retaining ring 104.

Slidably disposed within the housing 90 is a piston 106, having a duct 108 extending from a base or first end to the opposite end. The piston 106 is comprised of three cylindrical portions 110, 112, and 114, having different diameters. Portions 110 and 112 form a shoulder 116 and portions 112 and 114 form a shoulder 118. Portions 110 of the piston 106 is provided with an annular recess 122, and a peripheral recess 124; and portion 114 is provided with openings 126 for retaining balls 128. A coil spring 130, positioned within the housing 90 abuts against shoulder 116 and urges the piston 106 toward the base member 94. An O-ring 120 provides a gas-tight seal between the housing 90 and the piston 106.

Positioned within the bore 108 of the piston 106 is a tubular neck or stem 132, which is connected to a valve means designated generally by reference numeral 134. The stem 132 is retained within the piston 106 by means of the balls 128, which engage a peripheral groove 136 located in the stem 132. A coil spring 138 is provided for urging the stem 132 out of the piston 106. O-rings 140 provide a gas-tight seal. Valve means 134 is provided with a ball 142 which is biased toward a valve seat 144 by means of a spring 146.

Mounted on the inner surface of the base member 94 is a cup-shaped member 148 having an outer circular wall 150 and an inner circular wall 152. Balls 154 are maintained within the peripheral recess 124 of the piston 106 by means of the outer wall 150 of the cup-shaped member 148. Springs 156 are provided to force the cup-shaped member 148 toward the piston 106. Base member 94 has an opening 158 which permits gas to enter the release mechanism from a supply tank 12. The release mechanism is inflatably connected to the tank 12 by inlet means 160.

The manner of operating the release mechanism in this embodiment is similar to that of the embodiment shown in FIG. 3. FIGURES 8–10 illustrates different stages of the release mechanism during operation. Prior to use, the release mechanism is loaded by forcing the stem 132 into the bore 108 of piston 106, thus compressing the spring 138, until the balls 128, which are positioned in openings 126 of the piston 106, engage the peripheral recess 136 in the stem 132. The collar 100 is thereafter placed over portion 114, thus maintaining the balls in place and preventing the stem 132 from separating from the portion 106. The combined unit is then inserted into opening 98 in the housing 90 until shoulder 102 abuts against the housing 90, and the spring 130 abuts against the shoulder 116 of piston 106. The balls 154 are positioned within the peripheral recess 124, the cup-shaped member 148 is placed in position, and the base member 94 is attached to the housing 90. The release mechanism is thereafter attached to the gas tank 12, and the balloon 14 is attached to the stem 132.

When valve 16 is opened to inflate the balloon, the high pressure gas rushes into the release mechanism, through the piston 106 and into the balloon 14. The initial surge of the gas forces the piston 106 to the top of the housing 90 until shoulder 118 abuts against collar 100, and the spring 130 is compressed. When the piston 106 moves upward, the balls 154 are no longer retained within the recess 124 and are therefore free to fall out of said recess. In order to assure that balls 154 are forced away from the housing 90, the cup-shaped member 148 is forced upward by springs 156, thereby forcing the balls away. In order to prevent the balls 154 from rolling into the stream of gas and being shot into the balloon, wall 152 is provided to retain the balls in the release mechanism at all times. During the inflation process, the pressurized gas flows through the duct 108 and through valve 134 into the balloon. Note FIGURE 9 which illustrates the relative position of the various components during inflation.

The balloon continues to be inflated until the pressure in the gas storage tank 12 and in the release mechanism 10 drops to a small fraction of the initial pressure. The force of spring 130 eventually is great enough to overcome the force exerted by the gas pressure on the piston 106 and the piston is forced downward. Since the balls 154 have fallen away, the piston 106 is forced downward until its bottom surface rests on the balls 154. As the piston 106 moves downward, the balls 128 will clear the collar 100 and are free to drop out of openings 126. The stem 132 is ejected from the piston 106 by means of the spring 138, and the balloon 14 will ascend into the atmosphere. As the gas pressure within the tank 12 and the housing 90 decreases, and the stem separates from the piston, the valve means 134 will close and gas leakage out of the balloon will be prevented. Note FIGURE 10 which illustrates the stem 132 as it separates from the rest of the release mechanism 10.

In the above description and the attached drawings, a disclosure of the principles of this invention is presented, together with some of the embodiments in which the invention may be carried out.

Now, therefore, I claim:

1. A pressure actuated release mechanism comprising a housing including a retainer member and a sleeve member, means for releasably connecting said members together, a base member connected to one end of said retainer member, said base member having a chamber therein, said chamber provided with a piston seat located therein, inlet means in said base member, a piston slidably disposed within the retainer member and adapted to be positioned in more than one position, said piston having a bore extending from a base end to the opposite end, the base end of said piston adapted to seat on said piston seat, said piston seat limiting movement of said piston beyond a predetermined distance and means for maintaining said piston in a predetermined position, said means including a plunger slidably disposed within the chamber in the base member which is adapted to engage the under surface of the base end of the piston, projection of said piston into said chamber being dependent on the position of said plunger in said base member.

2. A pressure actuated release mechanism for connecting a source of fluid to a utilizing device, which comprises:

housing means provided with valve means for selectively supplying said fluid to said utilizing device, said housing means being secured to said utilizing device;

a base member connected to one end of said housing means for supplying fluid from said source into said housing means;

piston means slidably received in said housing means between first and second positions, said piston means having a bore therein extending from a first end to an opposite end thereof for conducting said fluid from said base member to said valve means;

means slidably received in said base member for movement from a given position to an operative position for releasably maintaining said piston means in said first position to render said piston means effective to open said valve means;

said fluid in said base member being effective to maintain said piston means in said first position and to slide said releasably maintaining means to said given position to permit said piston to move to said second position;

means rendered effective by said piston means in said first position for releasably securing said piston means to said housing means; and means rendered effective by a predetermined change in the pressure of said fluid for moving said piston means to said second position to close said valve means and to release said securing means so that said piston means is released from said housing means.

3. A pressure actuated release mechanism for connecting a source of pressurized fluid to a utilizing device, said pressurized fluid having a first and a second pressure, which comprises:

a housing having a wall defining an opening in one end thereof;

a base member connected to an opposite end of said housing to permit said fluid to flow into said housing;

tubular piston means slidably received in said housing for movement between first, second and third positions, said tubular piston means having an end projecting into said opening of said housing when said piston means is in said first and second positions;

tubular coupling means secured to said utilizing device and extending into releasable engagement with said tubular piston means in said first position for conducting said fluid from said tubular piston means to said utilizing device;

means received in said base member for releasably maintaining said piston means in said first position, said means including at least one spherical member and movable means for biasing said spherical member against an end of said piston means;

said piston means moving to said second position in response to said first fluid pressure;

said housing being provided with means rendered effective upon said movement of said piston means to said second position for limiting the movement of said movable biasing means to release said spherical member from said end of said piston means to permit said piston means to move to said third position; and means rendered effective upon said fluid attaining said second pressure for moving said piston means into said third position to release said releasable engagement between said coupling means and said piston means.

References Cited by the Examiner

UNITED STATES PATENTS

| | | | |
|---|---|---|---|
| 2,462,477 | 2/49 | Edwards | 166—242 |
| 2,670,927 | 3/54 | Edwards | 285—83 |
| 2,682,388 | 6/54 | Colquitt | 285—83 |
| 2,727,761 | 12/55 | Elliott et al. | 285—83 |
| 2,862,531 | 12/58 | Walker | 141—317 |
| 3,017,907 | 1/62 | Quail et al. | 285—306 |

RAPHAEL M. LUPO, *Primary Examiner.*

LOUIS J. DEMBO, *Examiner.*